(12) United States Patent
Jamalabad et al.

(10) Patent No.: US 6,682,684 B1
(45) Date of Patent: Jan. 27, 2004

(54) PROCEDURES FOR RAPID BUILD AND IMPROVED SURFACE CHARACTERISTICS IN LAYERED MANUFACTURE

(75) Inventors: Vikram R. Jamalabad, Somerville, NJ (US); Charles J. Gasdaska, Sparta, NJ (US); Milton Ortiz, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 220 days.

(21) Appl. No.: 09/656,770

(22) Filed: Sep. 7, 2000

(51) Int. Cl.$^7$ ............................... B28B 3/10; B27N 7/00
(52) U.S. Cl. .................. 264/308; 264/340; 264/219
(58) Field of Search ................... 364/468.26, 468.27, 364/274.24, 149; 395/119, 120; 264/40.7, 22, 308, 340, 343, 401, 219

(56) References Cited

U.S. PATENT DOCUMENTS

| | | | |
|---|---|---|---|
| 4,408,754 A | 10/1983 | Meier | 270/52 |
| 5,059,266 A | 10/1991 | Yamane et al. | 156/64 |
| 5,121,329 A | 6/1992 | Crump | 364/468 |
| 5,140,937 A | 8/1992 | Yamane et al. | 118/695 |
| 5,189,781 A | 3/1993 | Weiss et al. | 29/527.2 |
| 5,209,878 A | 5/1993 | Freed et al. | |
| 5,216,616 A | 6/1993 | Masters | 364/474.24 |
| 5,263,130 A | 11/1993 | Pomerantz et al. | 395/118 |
| 5,287,435 A | 2/1994 | Cohen et al. | 395/118 |
| 5,303,141 A | 4/1994 | Batchelder et al. | 364/149 |
| 5,340,433 A | 8/1994 | Crump | 156/578 |
| 5,398,193 A | 3/1995 | deAngelis | 364/468 |
| 5,402,351 A | 3/1995 | Batchelder et al. | 364/468 |
| 5,460,758 A | 10/1995 | Langer et al. | 264/401 |
| 5,503,785 A | 4/1996 | Crump et al. | 264/40.7 |
| 5,506,607 A | 4/1996 | Sanders, Jr. et al. | 347/1 |
| 5,535,128 A | 7/1996 | Laube et al. | 364/468.26 |

(List continued on next page.)

OTHER PUBLICATIONS

Wayne Tiller et al., "Offsets of Two–Dimensional Profiles", IEEE Computer Graphics and Applications, vol. 4, No. 9, Sep. 1984, pp. 36–46.

Martin Held, "A geometry–based investigation of the tool path generation for zigzag pocket machining", *The Visual Computer, International Journal of Computer Graphics*, vol. 7, Nos. 5–6, 1991, pp. 296–308.

Saif E.O. Saeed et al., "An Efficient 2D Solid Offsetting Algorithm", Geometric Modeling Project, Department of Mechanical Engineering, The University of Leeds, Leeds, LS2 9JT, England, dated prior to Sep. 7, 2000.

(List continued on next page.)

*Primary Examiner*—Minh Loan Tran
(74) *Attorney, Agent, or Firm*—Kris T. Fredrick

(57) ABSTRACT

Methods for improving layered manufacturing techniques to improve an objects' surface properties and shorten manufacturing time for support structures. One aspect of the invention forms surfaces having reduced or no concavities between layers having improved crack resistance. One method deposits alternate, surface improvement material on each layer near the future location of the main material surface, followed by deposition of the main material, the edges of which conform to the previously deposited and solidified alternate material. In this method, the center of the main material layers can be concave rather than the inter-layer regions. Another aspect of the invention provides removable structures to support the deposition of main material. The support structures provide support over main material cavities for depositing the material to form the cavity ceilings, while minimizing the time and material required to build the support structures. Minimized support structures include structures formed as columns supported by the cavity floor and angle braces to supported by the cavity walls. Some supports are supported by the side wall but not the floor, and other by the floor and not the side walls.

7 Claims, 14 Drawing Sheets

U.S. PATENT DOCUMENTS

| | | | |
|---|---|---|---|
| 5,554,336 A | 9/1996 | Hull | 264/401 |
| 5,572,431 A | 11/1996 | Brown et al. | 364/468.01 |
| 5,594,652 A | 1/1997 | Penn et al. | 364/468.26 |
| 5,595,703 A | 1/1997 | Vancreen et al. | |
| 5,596,504 A | 1/1997 | Tata et al. | 364/468.27 |
| 5,622,216 A | 4/1997 | Brown | 164/71.1 |
| 5,633,021 A | 5/1997 | Brown et al. | 425/375 |
| 5,649,277 A | 7/1997 | Greul et al. | 419/2 |
| 5,676,904 A | 10/1997 | Almquist et al. | |
| 5,694,324 A | 12/1997 | Masters et al. | 364/468.25 |
| 5,738,817 A | 4/1998 | Danforth et al. | 264/603 |
| 5,740,051 A | 4/1998 | Sanders, Jr. et al. | 364/468.26 |
| 5,859,775 A | 1/1999 | Barlage, III et al. | 364/468.15 |
| 5,866,058 A | 2/1999 | Batchelder et al. | 264/237 |
| 5,900,207 A | 5/1999 | Danforth et al. | 264/603 |
| 5,906,863 A | 5/1999 | Lombardi et al. | 427/385.5 |
| 5,968,561 A | 10/1999 | Batchelder et al. | 425/375 |
| 5,969,971 A | 10/1999 | Brown et al. | 364/468.26 |
| 6,027,326 A | 2/2000 | Cesarano, III et al. | 425/375 |

OTHER PUBLICATIONS

R. van Weeren et al., "Quality of Parts Processed by Fused Deposition", Solid Freeform Fabrication Proceedings, Sep. 1995, pp. 314–325.

Vikram J. Jamalabad et al., "Topology Driven Improvement of FDC Build Parameters", Solid Freeform Fabrication Symposium 1998, proceedings Aug. 10–12, 1998, The University of Texas at Austin, pp. 319–326.

Mark A. Hall et al., "Feature Abstraction in Knowledge–Based Critique of Designs", Issues in Design/Manufacture Integration–1990, DE–vol. 29, The American Society of mechanical Engineers, 1990, pp. 43–49.

Bertoldi M., Yardimici M.A. et al., "Domain Decomposition and Space Filling Curves in Tool path Planning and Generation", Solid Freeform Fabrication Proceedings, Aug. 1998, pp. 267–274.

Vikram R. Jamalabad et al., "Process Improvements in Fused Deposition of Ceramics (FDC): Progress Towards Structurally Sound Components", Extended Abstract 96–DETC–DFM–1279, 1 page, dated prior to Sep. 7, 2000.

D.T. Lee, "Medial Axis Transformation of a Planar Shape", III Transactions on Pattern Analysis and Machine Intelligence, vol. PAMI–4, No. 4, Jul. 1982, pp. 363–369.

Stratasys, Inc., "QuickSlice Manual", Jun. 17, 1996, pp. Q1–Q20 and Q71–Q76.

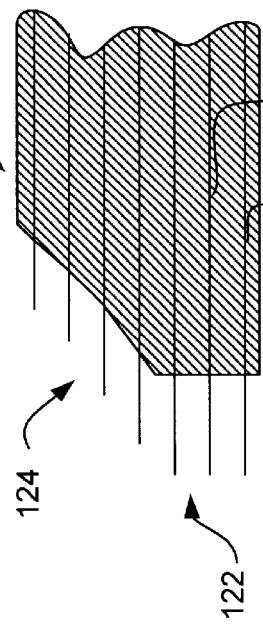
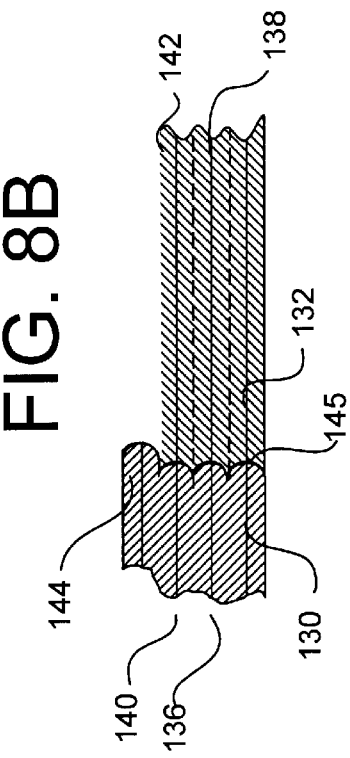
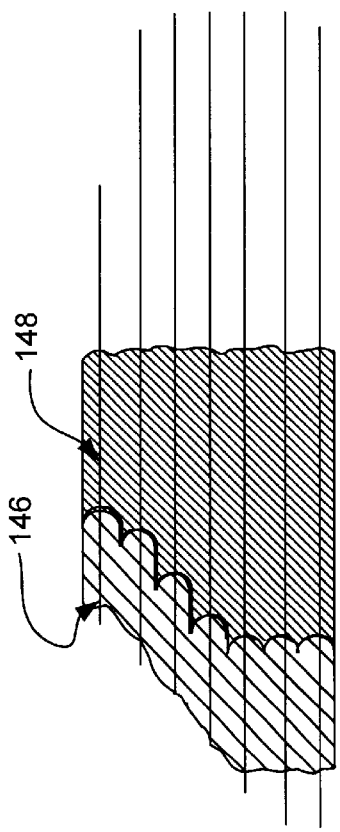
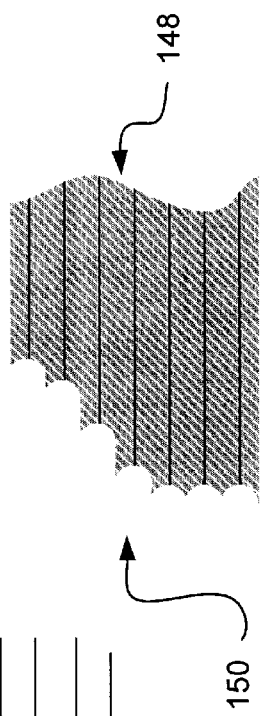

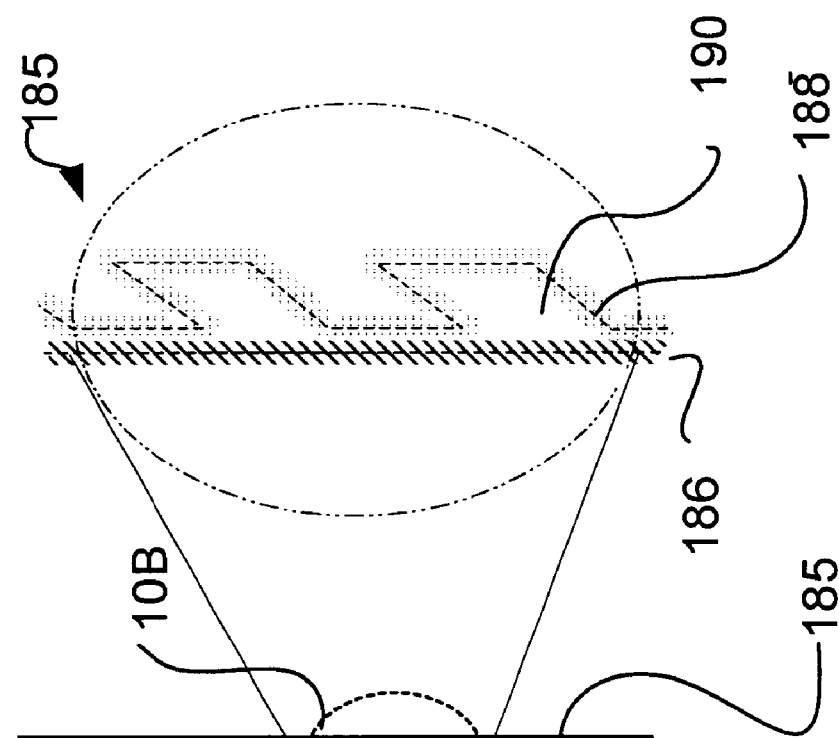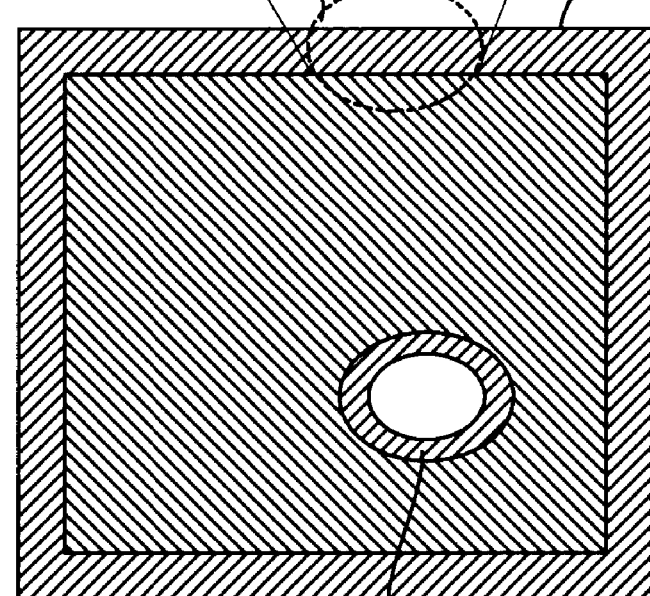

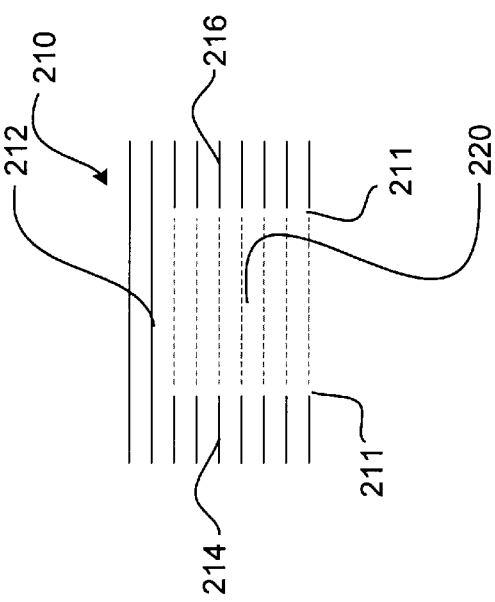
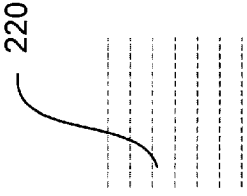
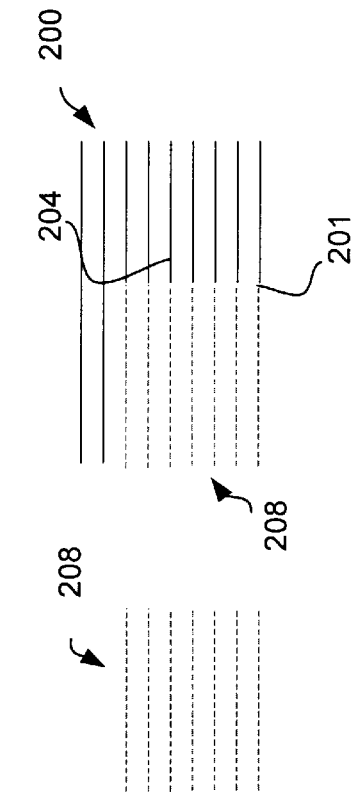
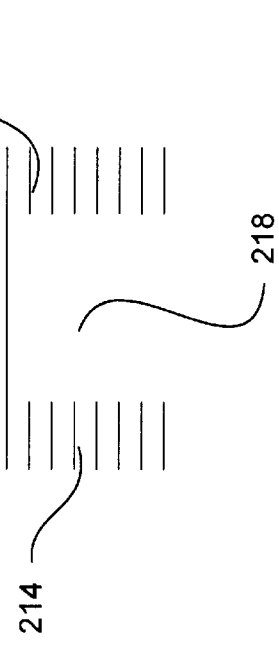
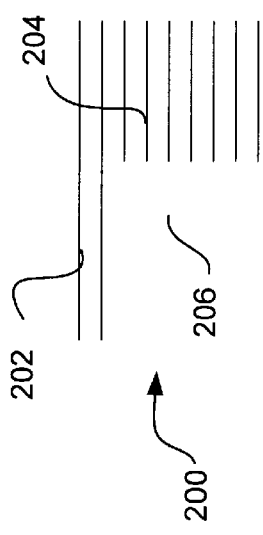

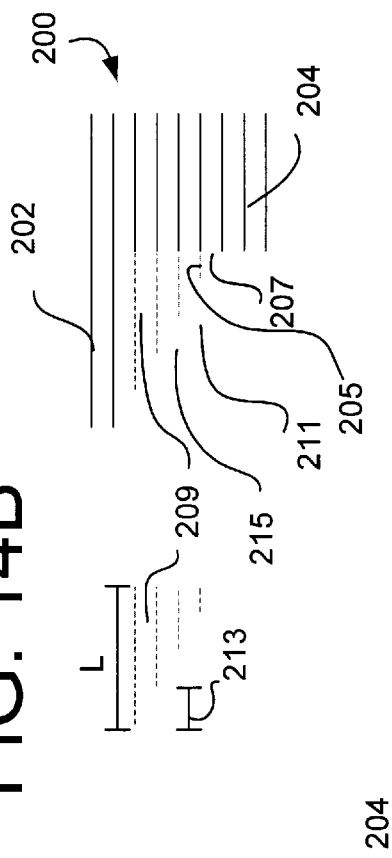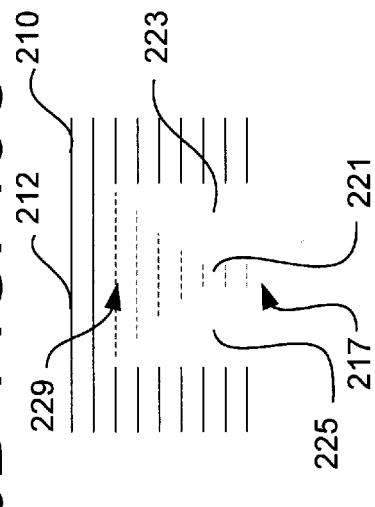

PROCEDURES FOR RAPID BUILD AND IMPROVED SURFACE CHARACTERISTICS IN LAYERED MANUFACTURE

RELATED APPLICATIONS

The present application is related to co-pending U.S. patent application Ser. No. 09/657,134 [1100.1103101], titled TOOL PATH PLANING PROCESS FOR COMPONENT BY LAYERED MANUFACTURE, filed on date even herewith.

FEDERAL SPONSORSHIP

This invention was made with Government support under contract number N00014-94-C-0115. The Government has certain rights in the invention.

FIELD OF THE INVENTION

The present invention is related generally to machine manufacturing of components. In particular, the present invention is related to rapid prototyping manufacturing including layered manufacturing and solid freeform fabrication.

BACKGROUND OF THE INVENTION

Using conventional techniques, a desired article to be made can initially be drawn, either manually or automatically utilizing a computer-aided design (CAD) software package. The article can be formed by removing material from material stock to form the desired shape in a machining operation. The machining operation may be automated with a computer-aided machining (CAM) process. The design and manufacture process may be repeated multiple times to obtain the desired part. A common practice is to mechanically remove material to create three-dimensional objects, which can involve significant machining skills and turn around time.

One process for making three-dimensional objects builds up material in a pattern as required by the article to be formed. Masters, in U.S. Pat. No. 4,665,492, discusses a process in which a stream of particles is ejected and directed to coordinates of the three-dimensional article according to data provided from a CAD system. The particles impinge upon and adhere to each other in a controlled environment so as to build up the desired article.

Processes and apparatus also exist for producing three-dimensional objects through the formation of successive laminae which correspond to adjacent cross-sectional layers of the object to be formed. Some stereo lithography techniques of this type use of a vat of liquid photocurable polymer which changes from a liquid to a solid in the presence of light. A beam of ultraviolet light (UV) is directed to the surface of the liquid by a laser beam which is moved across the liquid surface in a single plane, in a predetermined XY pattern, which may be computer generated by a CAD system. In such a process, the successive layers may be formed in a single, horizontal plane, with successive layers solidifying together to form the desired object. See, for example, U.S. Pat. No. 4,575,330 to Hull. Arcella et al., in U.S. Pat. No. 4,818,562, discuss a method for forming an article by directing a laser beam on a fusible powder which is melted by the beam, and which solidifies to form the desired shaped object.

Recently, various solid freeform fabrication techniques have been developed for producing three-dimensional articles. One such technique, used by Stratasys, Inc. (Eden Prairie, Minn.), is referred to as Fused Deposition Modeling (FDM). See, for example, U.S. Pat. No. 5,121,329 to Crump, herein incorporated by reference. FDM builds solid objects, layer by layer, from polymer/wax compositions according to instructions from a computer-aided design (CAD) software program. In one FDM technique, a flexible filament of the polymer/wax composition is heated, melted, and extruded from the nozzle, where it is deposited on a workpiece or platform positioned in close proximity to the dispensing head. The CAD software controls the movement of the dispensing head in the horizontal X-Y plane and controls the movement of the build platform in the vertical Z direction. By controlling the processing variables, the extruded bead or "road" can be deposited layer by layer in areas defined by the CAD model, leading to the creation of the desired three-dimensional object. Other examples of layered manufacturing techniques include multi-phase jet solidification techniques and/or laser-engineered net shaping. The extruded bead can be a ceramic suspension or slurry, a molten plastic, a powder-binder mixture, a polymeric material ready for curing or hardening, a molten metal, or other suitable materials which harden with time and/or exposure to an external stimulus. The bead can also be a curable strip of polymer or pre-polymer with polymerization initiated by radiation.

In conventional layered manufacturing techniques, the layers are formed or deposited in a flowable state which can be in the form of a series of long beads of extruded material. The beads can have a rounded, oblong, or circular transverse cross-sectional profile, where the external side faces of the bead can bulge outward. The conventional material layers are typically rounded at the periphery, forming layer surfaces having convex intra-layer regions and sharp, mechanically weak concave inter-layer regions. In particular, where the stacked bonded layers form the manufactured part side surfaces, the concavities can form sharp crevices having poor properties with respect to crack propagation and fracture.

In conventional layered manufacturing, cavities, either external or internal, are often found in product designs. The cavities may have upper structures such as ceilings or overhangs. The upper structures may be cantilevered structures having one end or edge free or structures only unsupported in the middle, between supports on either side or edge. The structures are unsupported in the sense that during deposition or formation of the still flowable main material, the material will drop down through the cavity without a structure previously established to support the main material during hardening. The cavities below have a volume which can be defined by a downward projection of the unsupported portion of the main material above.

In conventional layered manufacturing, a support structure of secondary material is built, layer by layer, to provide a support structure for the material to be formed or deposited in the layer above. The secondary material forms layers which also require support from the layer below for their deposition. Using conventional methods, an unsupported structure is supported by secondary material, layer under layer, from top to bottom, until the bottom of the cavity is reached, or until the workpiece platform being used to build the article is reached. The secondary material is later removed by mechanical, chemical, or thermal means, leaving the main material article. A large amount of secondary material can be required to build the removable structure, as well as a large build time required to form the secondary material layers.

What would be desirable are methods suitable for making parts using layered manufacturing which provide superior crack resistant surfaces. Methods which require less time to build support structures would also be advantageous.

SUMMARY OF THE INVENTION

The present invention includes improved methods for making objects using layered manufacturing techniques, as well as the objects made possible through use of these methods. One group of methods forms objects having improved surface properties made possible by forming a mold layer of a second material prior to forming a main part layer of a first material. Another group of methods forms objects requiring less time and material to build. This group of methods includes methods for building minimized secondary material support structures having less volume than conventional support structures.

More particularly, the present invention includes methods for forming a mold layer of a second material along the periphery of the object surfaces to be improved. The second material layers can be convexly rounded at the periphery, forming a rounded mold layer to receive the later formed first material. The first material layer can thus form an impression of the second material layer along the periphery of the first material layer. The impression formed along the first layer side face can have a rounded, concave, middle intra-layer region and a convex, inter-layer region where the multiple layers stack together. The inter-layer convexities have superior mechanical strength and superior crack resistance relative to the concave inter-layer regions of the conventionally made parts.

In one method, a data file containing representations of a three-dimensional object is accepted as input. The data file can be a three-dimensional CAD file, for example, a stereo lithographic (STL) file. The three-dimensional data can be partitioned into horizontal slices or layers, which can be represented by two-dimensional closed curves or poly-line segments having an associated layer thickness. The curves can define the outside and/or inside of areas to be filled with the main material. The curves can later be filled with raster tool paths generated to fill the area with material. The user can identify surfaces of the three-dimensional object to receive surface improvement and, directly or indirectly, identify the curves or curve portions corresponding to the surfaces to be improved.

A set of secondary curves can then be generated, the secondary curves corresponding to secondary material areas to abut the main material areas. The secondary curves thus formed preferably correspond to layer areas having at least two bead widths of secondary material. Some embodiments form secondary material layers with no voids, while other embodiments form secondary material layers having voids to reduce material usage and build time. The secondary material curves can then be used to generate tool paths for the secondary material. The secondary and main material tool paths can be checked for consistency and lack of interference before being integrated and the processing completed.

In the manufacturing phase, the part can be built up, bottom to top, by depositing the secondary and main materials, layer by layer. If secondary material is called for in the current layer, a secondary material nozzle can deposit a bead of secondary material of the desired bead width along the previously calculated path. A main material nozzle can then deposit a bead of main material of the desired bead width and along the previously calculated tool path. The flowable main material, formed along the previously formed secondary mold layers, can form an impression of the mold layers convex edge shape, thereby attaining a concave intra-layer shape and a convex inter-layer shape, where the stacked layers join each other. The secondary material can be later removed, exploiting differential mechanical, chemical, or thermal properties. In a preferred embodiment, the main and secondary materials are not the same, but are the same material in other embodiments. Improved surfaces provided by the present invention can have improved mechanical properties due to the lack of sharp, inter-layer convexities.

The present invention also includes methods for building removable support structures that form the secondary structures using substantially less volume than the cavity volume. The support structures can have at least one sloping side surface having a substantial deviation from vertical. In one group of structures, the support forms an angle or corner brace, supporting the cavity ceiling from a side wall. The angle piece can have a width decreasing with depth, indenting or offsetting until the support piece has no width. In another group of structures, the support forms a column or interior wall having a wide topmost layer and less wide middle and bottom layers. The wide top layers support the main material layer above, with the lower layers decreasing in width. The lower layers can be indented or offset inward by a small amount at each layer. The indent amount is preferably less than about one-half of the bead width of the layer above.

One method for generating the minimized support structures accepts two-dimensional curves for each layer as input. The two-dimensional curves represent the inner and outer perimeters of the main material layers for the part to be built. The unsupported or overhanging structures can be identified by processing the layers of the main structure from top to bottom, beginning with the second to top layer. The layers can be processed as pairs having an upper and lower layer. The upper layer can be reduced in one or more dimensions by an indent or offset amount ultimately corresponding to the slope of the side surface of the minimized support structure. In some embodiments, certain dimensions are automatically or manually selected as not to be reduced in extent. The difference of the reduced projected upper layer and the lower layer corresponds to an unsupported upper area, which will require support prior to formation. New secondary support material curves can be generated at the current lower level to provide the missing support, and these newly added secondary support material curves added to the main material curves for the current, lower layer. The newly added curves will also require support from below during formation, and are added to the set of main material curves, but are identified as secondary material curves.

The current layer can be set to be the next lower layer, making the previous lower layer of the pair the upper layer, and the process repeated. The new calculation will now take into account any curves representing either unsupported main material or secondary support material. The process can be repeated for all layers of the part to be made.

One output of the method can be a set of secondary material curves to be filled with secondary support material. The secondary material curves can be further processed by raster filling the areas within the curves using conventional rasterizing techniques. The curves and tool paths generated can be checked for consistency and lack of interference, both within the secondary material and between the secondary and main materials. The rasters can be used as tool paths to control the formation or deposition of main and secondary material.

In manufacture, the main and secondary material tool paths can be fed to a layered manufacturing machine for each layer. The minimized support sloping side faces, which were likely calculated top down, are built bottom up. The sloping side faces of the support structures can be built with a slight overhang at each higher level, the overhang preferably not exceeding one-half (½) a bead width. The secondary material support structures can thus be built to have large dimensions at the topmost layer. In some objects, the next layer up will consist of a main material layer deposited on the now solidified secondary material layer.

BRIEF DESCRIPTION OF THE DRAWINGS

FIG. 8A is a highly diagrammatic side cross-sectional view of a design object having a surface curve, the design having been sliced into layers for layered manufacturing;

FIG. 8B is a highly diagrammatic side cross-sectional view of the object of FIG. 8A in the process of manufacture, with some main and secondary material layers having been deposited;

FIG. 8C is a highly diagrammatic side cross-sectional view of the object of FIG. 8B after all main and secondary material layers have been deposited;

FIG. 8D illustrates a highly diagrammatic side cross-sectional view the object of FIG. 8C after removal of the secondary material;

FIGS. 10A and 10B illustrate a highly diagrammatic top view of a secondary material layer, wherein the secondary material layer has substantial voids within;

FIG. 12A illustrates a highly diagrammatic side cross-sectional view of an object having a cavity defined beneath an external overhang, the overhang requiring support during deposition;

FIG. 12B is a highly diagrammatic side cross-sectional view of a conventional secondary material support used to support the overhang of FIG. 12B;

FIG. 12C is a highly diagrammatic side cross-sectional view of the composite component formed by the deposition of the main and secondary material layers of FIGS. 12A and 12B;

FIG. 13A is a highly diagrammatic side cross-sectional view of a component having an interior cavity having an unsupported layer requiring support during deposition;

FIG. 13B is a highly diagrammatic side cross-sectional view of a conventional secondary support for supporting the unsupported layer of FIG. 13A;

FIG. 13C is a highly diagrammatic side cross-sectional view of the composite component formed by the deposition of the main and secondary material layers of FIGS. 13A and 13B;

FIG. 14A is a highly diagrammatic side cross-sectional view of a component having an exterior cavity defined by an overhang;

FIG. 14B is a highly diagrammatic side cross-sectional view of a secondary support structure formed according to the present invention, requiring less material and deposition time;

FIG. 14C is a highly diagrammatic side cross-sectional view of the objects of FIGS. 14A and 14B deposited layer by layer;

FIG. 15A is a highly diagrammatic side cross-sectional view of an object having an internal cavity requiring support during manufacture;

FIG. 15B is a highly diagrammatic side cross-sectional view of a secondary support structure having two sloping side faces requiring less material and deposition time;

FIG. 15C is the object of FIG. 15A deposited over the secondary support material of FIG. 15B, on a layer-by-layer basis;

DETAILED DESCRIPTION OF THE INVENTION

Figure 1:
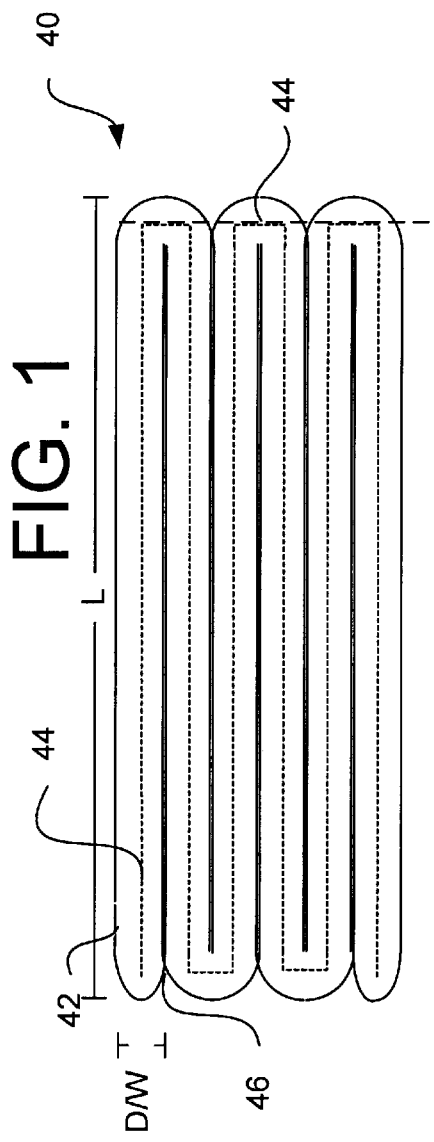
FIG. 1 is a top, cross-sectional view through a single layer of a prior art object formed by a bead deposited along a tool path.

FIG. 1 illustrates a top view of a single layer of an object 40 made using layered manufacturing techniques. Object 40 is formed from a single bead 42 laid along a tool path 44, having a zigzag pattern to substantially fill a rectangular area. Bead 42 has a diameter or width indicated at D/W and a length indicated at L. Bead 42 may be seen to flow together at inter-bead region 46 where adjacent sections of the bead abut one another. Bead 42 and object 40 may be formed using any suitable manufacturing technique, for example, fused deposition techniques, multi-phase jet solidification techniques, or laser-engineered net shaping techniques. Bead 42 can be a ceramic suspension or slurry, a molten plastic, a powder-binder mixture, a polymeric material ready for curing or hardening, a molten metal, or other suitable materials which harden with time and/or exposure to an external stimulus. Bead 42 can also represent a curable strip of polymer or pre-polymer with polymerization initiated with UV radiation.

Figure 2:
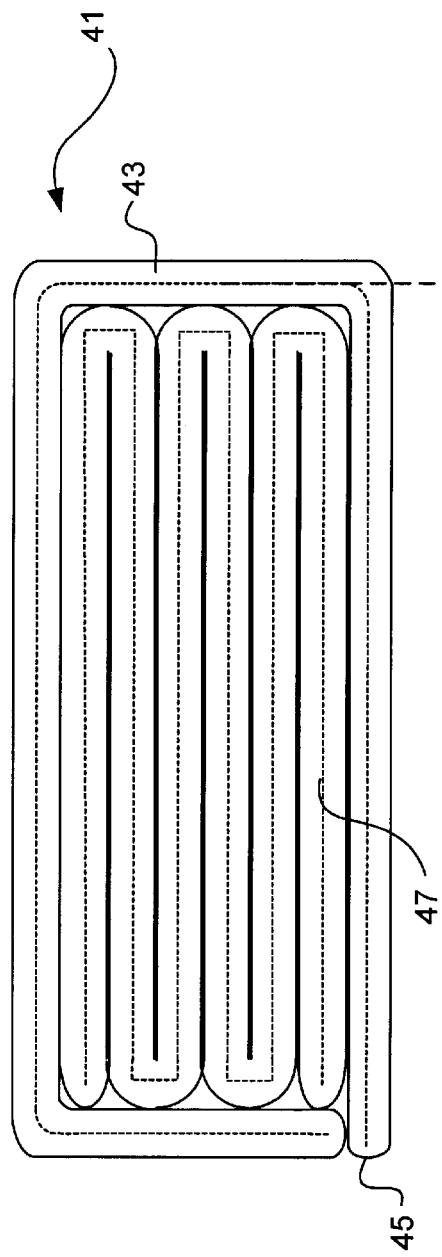
FIG. 2 is a top, cross-sectional view through a single layer of a prior art object formed by a bead deposited along a-tool path, including a perimeter contour tool path.

Referring now to FIG. 2, another object 41 is illustrated, also formed using layered manufacturing. Object 41 is similar to object 40 of FIG. 1, but has an outer contour bead 43 formed of a first bead 45 which surrounds an internal second bead 47. Both FIGS. 1 and 2 illustrate conventional layered manufacturing techniques.

Figure 3:
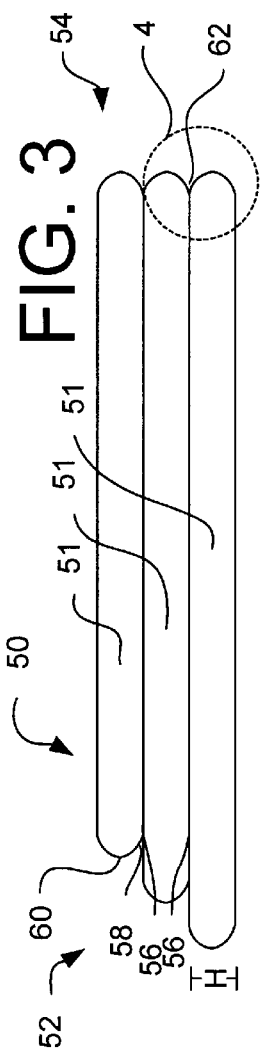
FIG. 3 is a side view of a prior art object formed by layered manufacturing techniques having serrated outer surfaces and interlayer surface concavities.

FIG. 3 illustrates a prior art object 50 formed of three vertical layers 51 abutting one another along interlayer planes 56. Object 50 includes a sloping surface 52 and a substantially vertical surface 54. A bead height is indicated at "H" for layer 51. Numerous interlayer serrations may be seen along sloping face 52 at interlayer regions 56. Serrations are formed having concave regions 58 between layers 51 and convex, rounded regions near the intralayer regions indicated at convex surface 60. Vertical surface 54 may also be seen to have numerous sharp concave regions 62 disposed along interlayer regions 56. Sloping face 52, in particular, has sharp serrations along the staircased face. Concavities 58 and 62 may be seen to have sharp notches which are stress risers having low mechanical strength.

Figure 4:
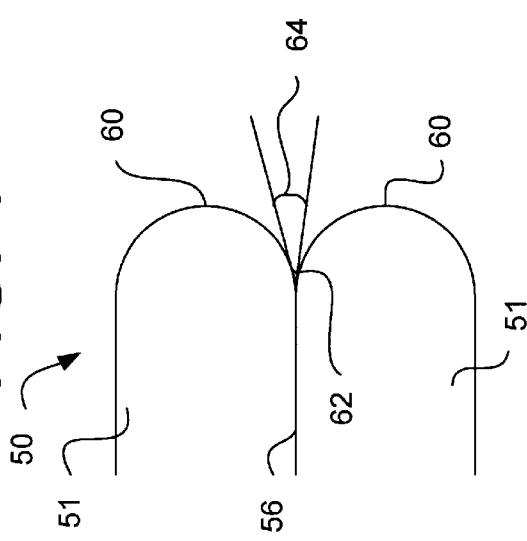
FIG. 4 is a detailed view of a surface interlayer of FIG. 3.

Referring now to FIG. 4, prior art concavity 62 of FIG. 3 is illustrated in greater detail. Concavity 62 may be seen to lie along interlayer region 56 between two beads or layers 51. Layers 51 extend to an outermost convex and rounded region 60, and come together along a sharp acute angle 64 formed between the two layers. In the limiting case, the acute angle 64 approaches zero degrees (0°) as a limit. Concave region 62 acts as a region likely to cause crack propagation and weaken the structure.

Figure 5:
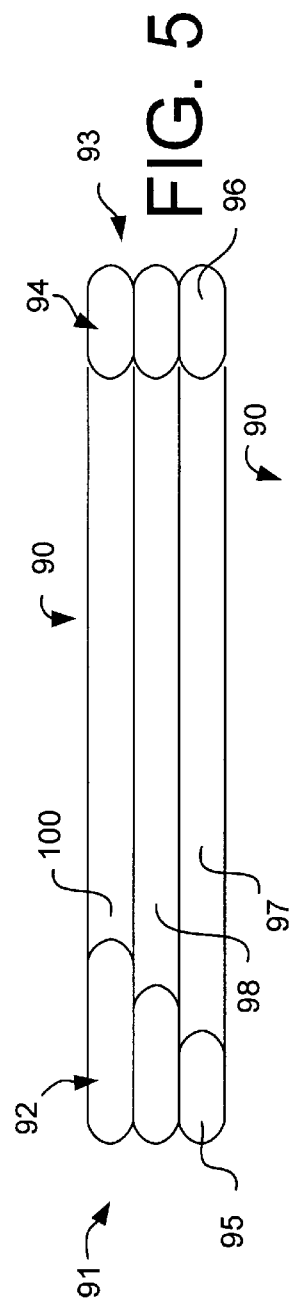
FIG. 5 is a side view of an object formed during layered manufacture having the main material abutted by a removable secondary surface improvement material.

Referring now to FIG. 5, an object 90 is illustrated, showing one method of layered manufacture according to the present invention. Object 90 is shown to be formed of three vertically stacked layers 97, 98, and 100. Object 90 includes a sloped external surface 91 and a substantially vertical external surface 93. Object 90 is formed of a first or main material, which is abutted in FIG. 5 by a secondary or supporting material 92 and 94. The structural material of structures 92 and 94 can serve as a scaffolding or mold for forming the outside of object 90 so as to have improved surface properties. As will be later discussed, support structures 92 and 94 are preferably laid down or deposited prior to the deposition of the main material. For example, a secondary material layer 95 may be first deposited, followed by a secondary material layer 96, thereby forming convex regions inwardly directed. First main material layer 97 may then be deposited in between support layers 95 and 96, thereby flowing to assuming the shape of the support layers 95 and 96. This may be repeated layer by layer, with the main material deposition following the surface improvement material deposition.

Figure 6:
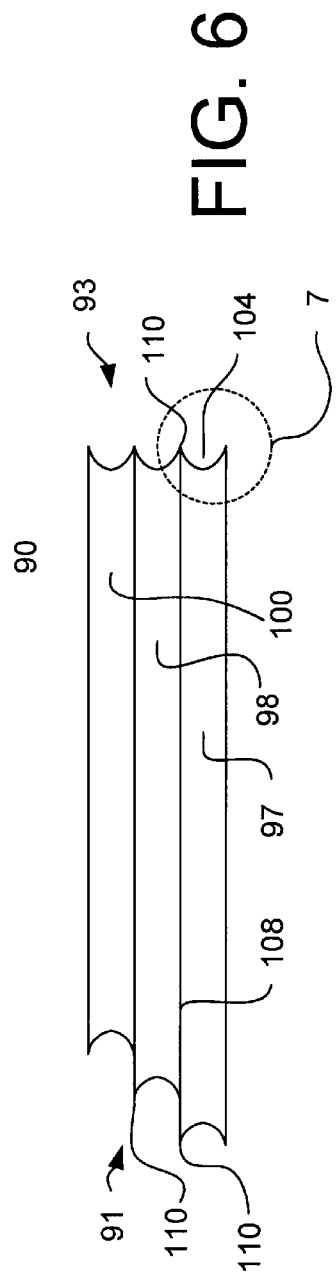
FIG. 6 illustrates the object of FIG. 5 after removal of the secondary surface improvement material.

Referring now to FIG. 6, object 90 is shown after removal of support structures 92 and 94. Support structures 92 and 94 are preferably formed of an easy-to-remove material which differs from the main material. In a preferred method, the structural material does not mix with the main material, and is easy to separate. In one embodiment, the alternate material is physically separable, which can include tearing apart of material and/or use of a non-sticking material. In another embodiment, the alternate material has a lower melting point than the main material and can be separated by heating. In yet another embodiment using chemical separation methods, the alternate material is soluble in a solvent that does not dissolve or damage the main material. Sloping side face 91 and vertical side face 93 may both be seen to lack the sharp concave features of object 50 illustrated in FIG. 3. In particular, interlayer regions 108 may be seen to form convex features 110, while the intra-layer regions form smooth concave regions 104.

Figure 7:
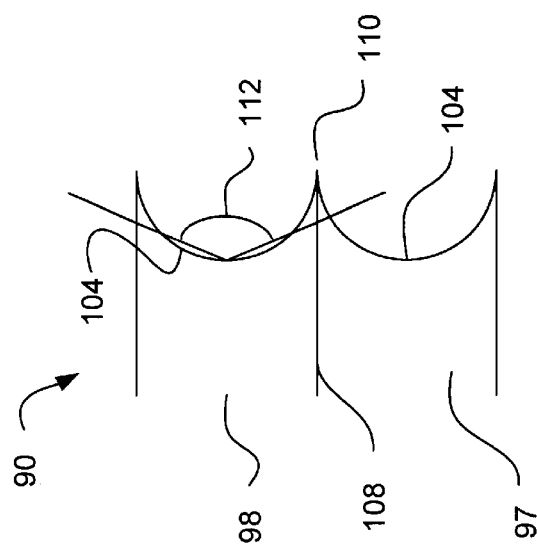
FIG. 7 illustrates in detail the object of FIG. 6, including an intra-layer surface rounded concavity and an interlayer surface convexity.

Referring now to FIG. 7, concave region 104 is illustrated in greater detail. Concave region 104 may be seen to lie in an intra-layer region of object 90. In the embodiment illustrated, a shallow angle 112 may be seen to be formed by concave rounded regions 104. In the limiting case, a tangent along a semicircular or concave surface may be seen to approach an angle of 180 degrees as a limit. In comparing the objects of FIGS. 4 and 7, it may be seen that object 90 of FIG. 7 lacks the sharp serrations and crevices present at inter-layer region 56 in the formation of object 50 of FIG. 4.

Referring now to FIG. 8A, an object 120, as designed, is illustrated. Designed object 120 may be the object as modeled in a CAD drawing or other design tool. Object 120 includes a curved surface region 124 and a straight surface region 122. Object 120 has been divided into numerous slices 126, denoted by lines in FIG. 8A. In FIG. 8A, slices 126 are demarcated by the center line of each layer. While FIG. 8A shows all of the slices having the same thickness, it is contemplated that the slices may have different thicknesses, if desired. Some embodiments of the invention have layer thicknesses of between about 0.001 inches and about 0.030 inches. In one embodiment of the invention, the layer thickness is between about 0.005 inches and about 0.015 inches.

FIG. 8B illustrates an object being manufactured to form design object 120. A first surface support material 130 has been deposited, followed by a first main material layer 132, followed by a second surface support layer 136, followed by a second main layer 138, followed by a third surface support material layer 140, followed by a third main material layer 142, followed by a fourth surface support material layer 144. An interface region 145 between the structural material and the main material may be seen. FIG. 8C illustrates a main structure or part 148 abutting a support structure 146 after completion of the support structure. FIG. 8D illustrates main structure 148 after removal of support structure 146, thereby exposing side surface 150.

Figure 9B:
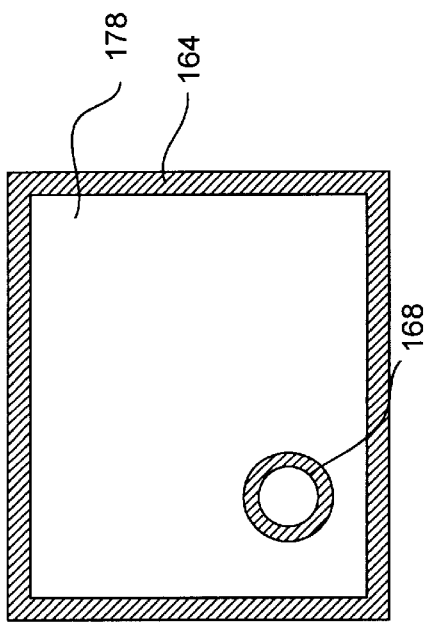
FIG. 9B illustrates the manufacture of the FIG. 9A design after the secondary surface improvement material layers have been deposited as a mold for the main material layer.
Figure 9C:
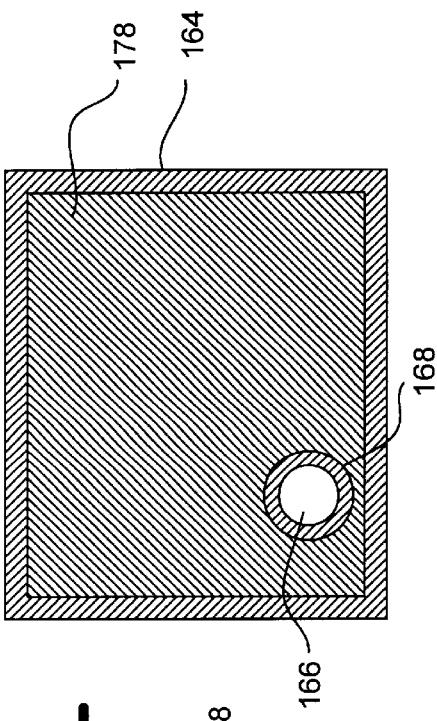
FIG. 9C illustrates the manufacture of the FIG. 9B object after deposition of the main material layer abutting the secondary surface improvement material.
Figure 9A:
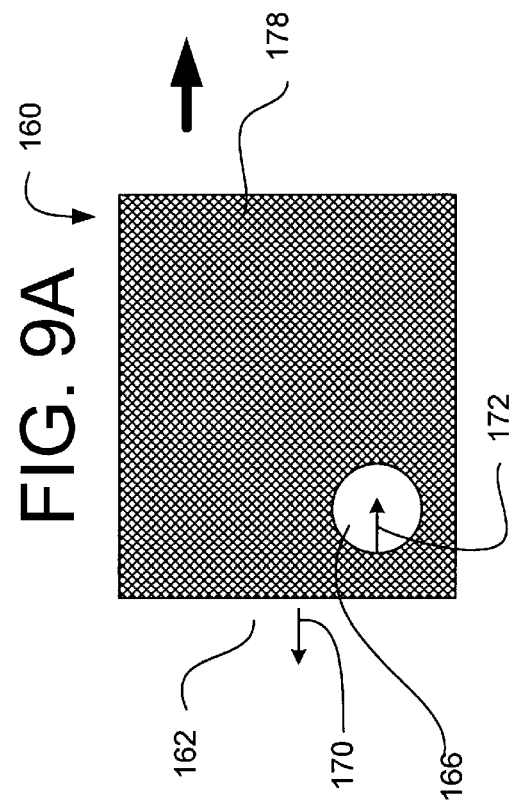
FIG. 9A is a highly diagrammatic top view of a design object layer to be manufactured by layered manufacturing, the design having an internal rounded cavity surface and an external perimeter surface.

Referring now to FIG. 9A, a single design layer 160 is illustrated in a top view. Design layer 160 includes a main material layer or region including an interior cavity 166. Arrow 170 indicates an out direction from main material region 178 on the external surface, while arrow 172 indicates the out direction from the interior surface within cavity 166. The term "out" thus refers to a direction away from the main material and toward the non-material region or air space near the surface.

Figure 9D:
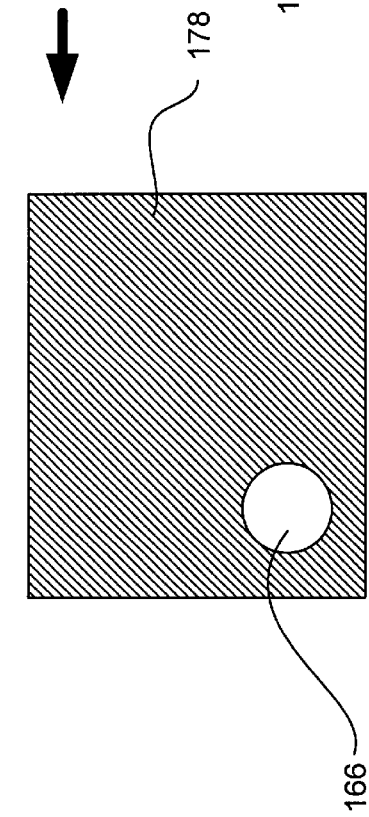
FIG. 9D illustrates the manufacture of the FIG. 9C object after removal of the secondary material.

Referring now to FIG. 9B, an object layer being created according to design layer 160 is illustrated. FIG. 9B illustrates the object after deposition of the secondary material within a peripheral region and an interior region. Secondary material may be seen to have been deposited within an exterior margin 164 and interior margin 168. Region 178 is indicated as not yet filled by any main material. FIG. 9C shows the object layer under construction after deposition of main material within region 178. The main material within region 178 may be seen to abut secondary material at regions 164 and 168, thereby being formed between the two secondary material regions. In this way, interior surfaces may have the surface characteristics improved as well as the exterior surfaces. FIG. 9D illustrates the object after removal of the secondary support material, leaving main material region 178 surrounding cavity 166.

FIGS. 10A and 10B illustrate a main material layer 180 similar to main material layer 178 of FIG. 9C. The embodiment illustrated includes secondary material layers using less material. Secondary material has been deposited as an internal layer 182 and as an external layer 185, similar to layers 168 and 164 of FIG. 9C. External secondary material layer 185 is illustrated in greater detail in FIG. 10B, illustrating a support structure having a large void contribution. Exterior support layer 185 may be seen to include a contour bead 186 disposed along the exterior of the object and a second bead 188 formed in a zigzag or squarewave pattern, thereby leaving a number of voids 190. External layer 184 thus provides support for forming main material layer 180, while using less material and requiring less time to form the secondary support layer.

Figures 11A, 11B:
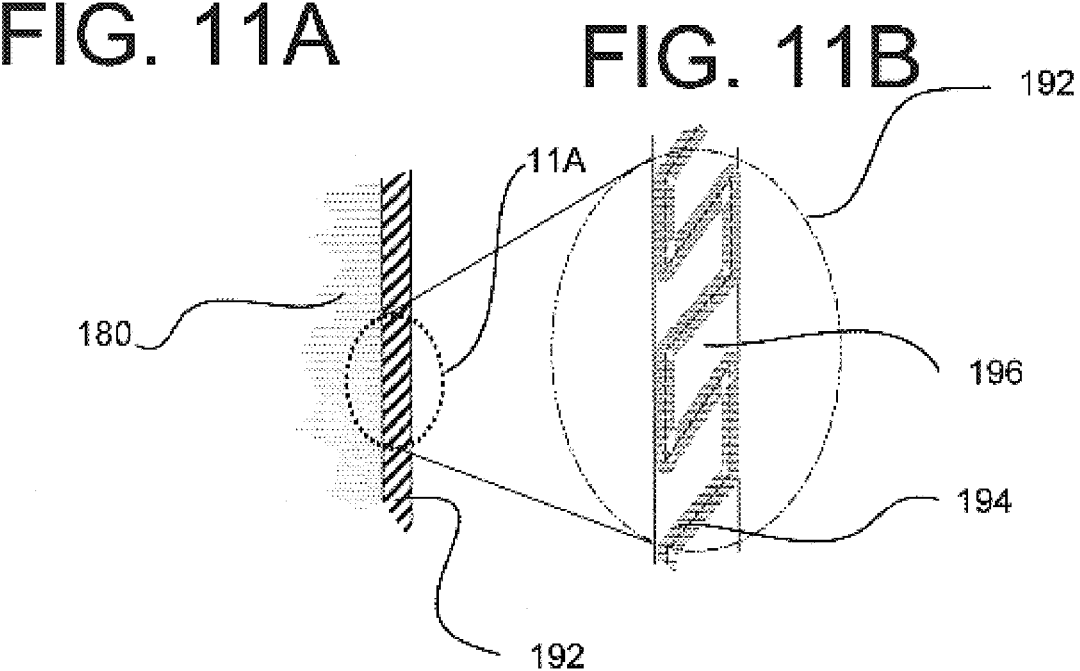
FIGS. 11A and 11B illustrate a highly diagrammatic top view of a secondary material layer, wherein the secondary material layer has substantial voids within and no contour bead.

Referring now to FIGS. 11A and 11B, a main material layer 180 similar to main material layer 178 of FIG. 9C may be seen to be surrounded by an external structural support or surface improvement layer 192 using less secondary material to construct. Support layer 192 is formed of a single bead 194 configured in a zigzag or squarewave pattern having a number of voids 196. Support region 192 may be seen to have an even larger void contribution than region 185 of FIG. 10B. External support layer 192 may be appropriate where a less fine external finish in required or allowed for the main material portion.

FIG. 12A illustrates a highly diagrammatic side view of a prior art part 200 having a cantilevered or unsupported ceiling structure 202 and a side wall, or supported structure 204, thereby defining a side cavity 206 under the overhang of the cantilevered portion 202. Cantilevered portion 202 can define a cavity volume by projecting the cantilevered portion vertically downward. FIG. 12B illustrates a secondary material support 208 suitable for supporting cantilevered portion 202. FIG. 12C illustrates support region 208 supporting cantilevered region 202. Current methods teach forming support region 208 near, but not touching, side wall 204, leaving a space 201 to ease removal of support structure 208. FIGS. 12A through 12C illustrate a prior art method for generating support for a part during manufacture. In particular, it may be seen that cantilevered region 202, when formed by the deposition of not-yet-solid bead, would require support during solidification of the bead over cavity region 206.

Referring now to FIG. 13A, another part 210 is illustrated having a supported region 214, a supported region 216, and an unsupported region 212 suspended therebetween. Unsupported region 212 defines a cavity 218 thereunder. Unsupported region 212, when formed using many layered manufacturing techniques, requires support during the solidification of the bead over interior cavity region 218. FIG. 13B illustrates a secondary support structure 220 suitable for use in manufacturing object 210. FIG. 13C illustrates object 210, after manufacture, being supported by secondary supporting material 220. Support material 220 may be seen to support unsupported region 212 during the solidification of the bead. Support region 220 may be removed after solidification of the main material. Current methods teach forming support region 220 near, but not touching, supported regions 214 and 216, leaving spaces 211 to ease removal of support structure 220. FIGS. 12A through 12C and 13A through 13C illustrate prior art methods of providing secondary material support for a part according to layered manufacturing techniques.

Referring now to FIG. 14A, structure 200 of FIG. 12A is again illustrated. FIG. 14B illustrates a minimized support structure 209 suitable for support of cantilevered region 202. FIG. 14C illustrates minimized support structure 209 disposed within cavity 206. As may be seen from inspection of FIG. 14C, a substantial void volume 211 is left within cavity 206. Void volume 211 results in less material being used for formation of support structure 209, as well as less time required to form support structure 209. Support structure 209 does not extend to the bottom of cavity 206, but rather abuts main structure portion 204 along an interior wall region 207, ending at a base layer 205. FIG. 14C thus illustrates a support structure that fills less than half of the cavity volume it is disposed within. Support structure 209 may be seen to have a sloping side face 215.

Referring again to FIG. 14B, support structure 209 may be seen to have a length for each layer indicated at "L" and an indent or offset for each layer beneath the immediately disposed upper layer. The indent is indicated at 213. In one embodiment, the indent varies between about one-tenth ($\frac{1}{10}$) of a bead diameter and about one-half ($\frac{1}{2}$) of a bead diameter. In a preferred embodiment, the indent does not exceed one-half ($\frac{1}{2}$) of a bead diameter, so as to minimize the unsupported region of the bead during bead solidification. In another embodiment, not requiring separate illustration, base layer 205 is repeated downward to the floor of the cavity, and can be several beads wide.

Referring now to FIG. 15A, object 210 of FIG. 13A is once again shown. FIG. 15B illustrates a minimized support structure 221 having two sloping or curved side faces 219. FIG. 15C illustrates support structure 221 disposed within cavity 218, thereby supporting overhanging region 212. Support structure 221 may be seen to have a base portion 217 much smaller than top portion 229. Base 217 may be supported by a workpiece platform or the cavity floor. Sloping faces 219 may be seen to provide void areas 223 and 225 within cavity 218. Minimized support structure 221 thus provides support while requiring substantially less material and deposition time for the support structure.

Qualitatively, the structures of FIGS. 14A–C and 15A–C are generated using methods which plan the layers from top to bottom and which build the layers from bottom to top. Each layer to be minimized can be indented at each level, not more than the bead width, otherwise the bead would drop down. The indent is preferably not more than one-half ($\frac{1}{2}$) of a bead width. The indenting can continue at each level until no more support material is required, or until the minimum allowable support layer dimension is reached. Some embodiments continue forming the minimum allowable support layer dimension all the way to the bottom.

The indents form a local slope which can be defined as the change in local height per the change in local width. In one embodiment, the local slope is less than about ten (10). In another embodiment, the local slope is less than about two (2). One embodiment has a side face having a deviation from vertical of at least forty degrees (40°). The resulting support structures occupy less than about twenty percent (20%), forty percent (40%), and fifty percent (50%) of the main material cavities in various embodiments of the invention.

The methods used to create the structures of FIGS. 14A–C and 15A–C preferably operate on curves generated by slice programs which slice 3D CAD objects into two-dimensional curves having a thickness. The two-dimensional curves can be approximated as poly-lines or a series of ordered points. The curves define the outer perimeters to be filled, as well as the inner void perimeters to be left unfilled, for each layer of the part to be made. For each curve, the curve immediately above that curve can be projected downward onto the curve, and the difference taken to determine any unsupported areas that would allow deposited beads to fall through. The upper curves should first be reduced by the indent amount to allow for the support structure sloping side faces and reduced secondary material usage previously described. Any unsupported areas can be handled by creating new curves to form support areas, and the new curves added to the current level curves, as the new curves in turn require support from the level below. This process can continue until the bottom most layer is reached. The result is a set of additional curves defining areas to be filled with secondary support material for each layer.

The secondary material curves and the main material curves can be used as input by a rasterizing program which generates rasters to be used as tool paths to fill the areas within the curves with material. The tool paths can be followed for each layer by a layered manufacturing tool head, such as an extruder nozzle, in generating the support structures from the bottom up. In one embodiment, two nozzles are used, one for the alternate material and one for the main material.

Figure 16:
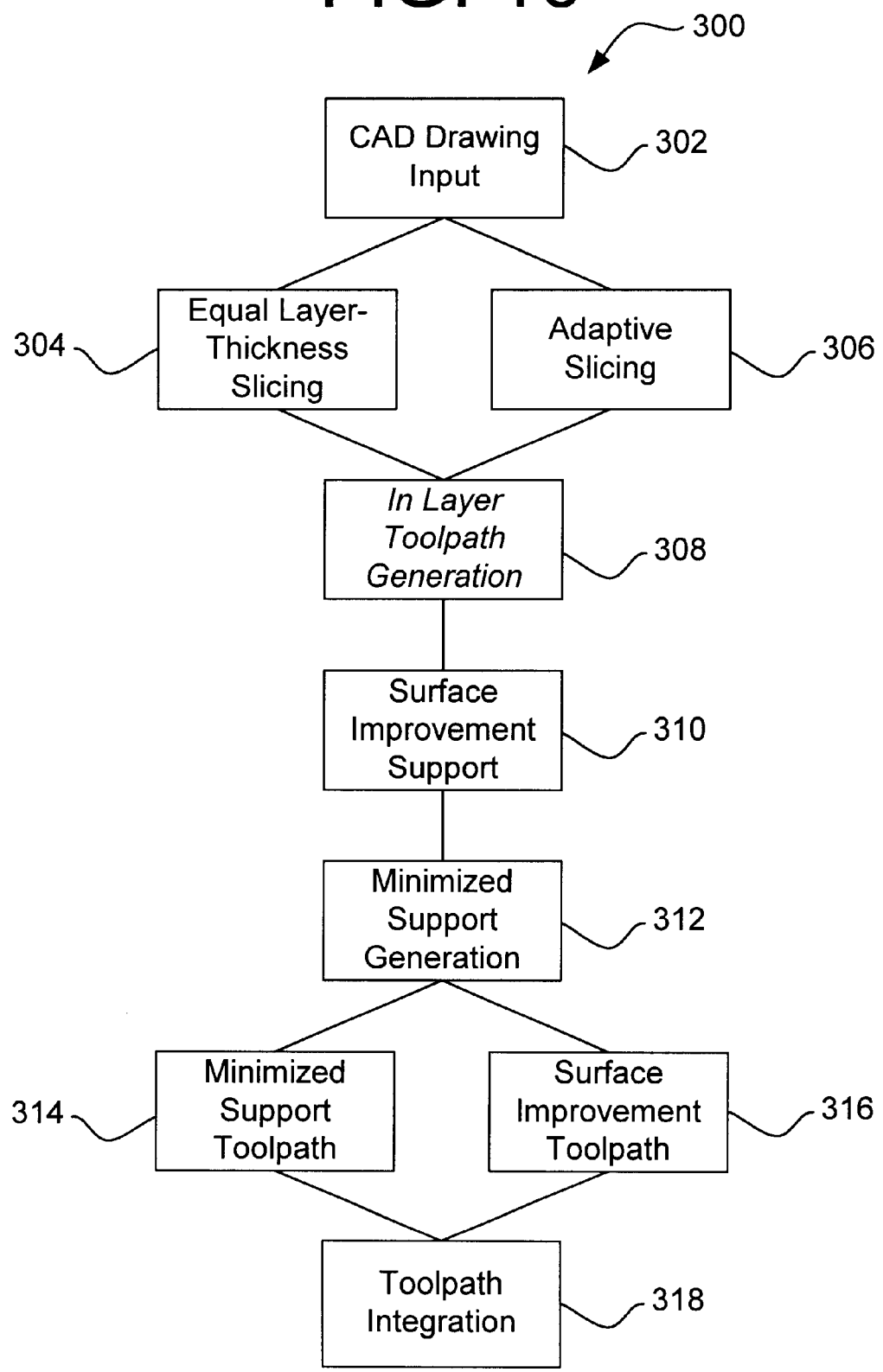
FIG. 16 is a high level flow chart of a process used to generate tool paths from a CAD drawing.

Referring now to FIG. 16, a high level method or algorithm 300 is illustrated. Method 300 and the subsequent methods can be implemented on a computer using any suitable programming language. Suitable languages include, without limitation, Fortran, C, C++, Java, BASIC, and Pascal. Method 300 can operate on a CAD file containing a representation of an object to be manufactured, and can output data files describing curves to be filled in, and tool paths to be followed to fill in the curves. The present invention explicitly includes computer programs inputting and outputting data, where the output data will ultimately be used to drive layered manufacturing tools. The computer programs can exist as human readable source code and/or as compiled and ready to execute machine code. The computer programs can reside on machine readable media, including magnetic and optical discs.

Method 300 can begin with a CAD drawing input step 302, which can include input of a 3D CAD drawing file, for example a 3D Auto-CAD® drawing file. The 3D CAD file can include primitives such as solid polygons with holes and extruded two-dimensional solids. The 3D file can also include a 3D model which has been converted into a set of triangles, such as is found in a stereo lithographic (STL) file. In some embodiments, surfaces have been marked or tagged by a human or machine user to indicate that selected surfaces are to be improved or used to abut support structures. The curved surfaces of the 3D object may be represented or approximated by a surface formed of the straight line segments of triangles.

Proceeding to step 304, the 3D CAD model can be sliced into numerous equal thickness slices along the X-Y or horizontal plane. One example of slicing technology is the QuickSlice program, available from Stratasys, Incorporated (Eden Prairie, Minn.). The X-Y plane is typically horizontal due to the importance of gravity in determining the placement of flowable, semi-solid beads requiring solidification. The slices typically correspond to the layers formed in layered technology and may be one bead thickness in height. In an illustrative example, in a vertically disposed cylindrical solid having a vertically disposed interior cylindrical cavity or annulus, a slice could be modeled as a large circle having a smaller circle within, where the solid material portion corresponds to the area between the two circles. The two circles, along with a depth or height, could represent the slice. In one embodiment, the cylinder and interior cavity is modeled using an STL format, and the circles are actually represented by poly-lines or series of points approximating the circles.

In one method, the slice thicknesses are not equal, and step 306 is executed in place of step 304. Step 304 utilizes adaptive slicing, which can vary the slice thickness according to the geometry and desired surface properties of the part being made. In the example of the vertically disposed cylinder having a vertical cavity, the slice could have a large thickness, as the vertical cross section may not vary with height. Tata et al. discuss an adaptive slicing technique in U.S. Pat. No. 5,596,504.

With the slices completed, step 308 can be executed to form a tool path within the slice to form that layer of the object by filling in the solid portion of the slice by traversing the area with an additive technology tool head, for example, by using a Fused Deposition Machine. In the vertical cylinder example, a zigzag pattern may be created to lay down the bead between the inner and outer circles or poly-lines of the slice. Standard tool path generation techniques can be used, well known to those skilled in the art. An improved tool path generation method, discussed in co-pending U.S. patent application Ser. No. 09/657,134, entitled TOOL PATH PLANING PROCESS FOR COMPONENT BY LAYERED MANUFACTURE [1100.1103101], herein incorporated by reference, can also be used in conjunction with the present invention. Step 308 can be executed before and/or after the generation of additional layers created to improve the surface properties or provide support for the deposition of the main material layer.

In step 310, layers can be created to improve surfaces of the main material. In the example of the vertical cylinder having an interior cavity, the inner and/or outer surfaces may be improved by creating an inner and/or outer annular shell, respectively. The layers of the shell may be laid down first in the layer, followed by the deposition of the main material.

In step 312, the minimized support structures of the present invention can be created on a layer-by-layer basis. In the example of the vertical cylinder, if the interior cavity did not extent entirely through the cylinder, but was a blind cavity having a ceiling, the deposition of the ceiling would require creation of a support structure prior to depositing the first beads of the ceiling. Step 312 allows for creation of a support structure that does not require filling the entire cavity, to minimize support formation time and support material usage.

In step 314, the tool path for the minimized support structures created in step 312 can be generated. The tool path for the surface improvement layers created in step 310 can be generated in step 316. Step 308 can also be executed at this time. In step 318, the tool paths for the main part, the surface improvement layers, and the support layers can be integrated and checked for consistency and lack of interference. After execution of step 318, the layers and tool paths are preferably completely generated.

Figure 17:
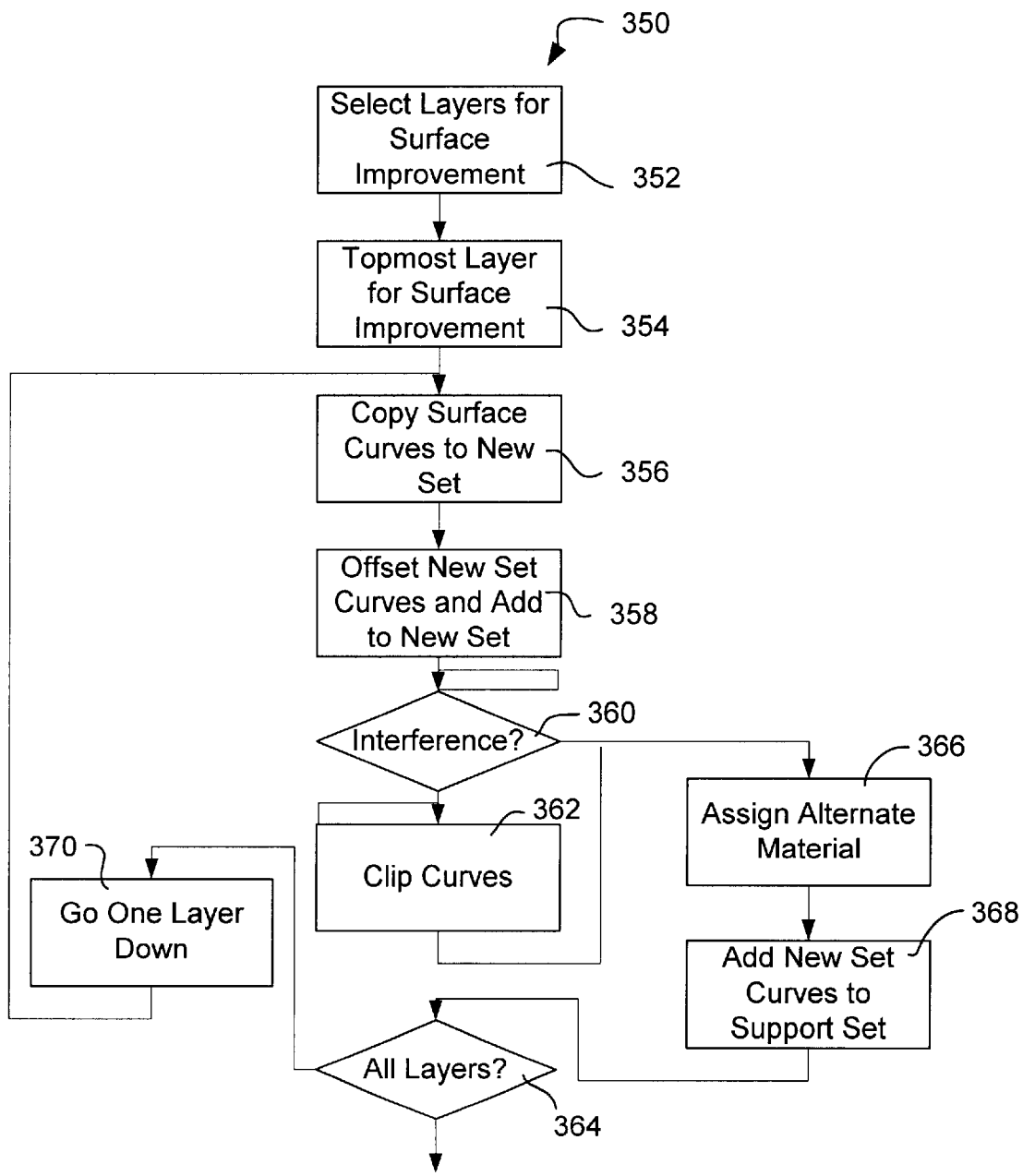
FIG. 17 is a flow chart describing a procedure for generating curves for all the layers requiring surface improvement according to the present invention.

Referring now to FIG. 17, a method 350 is illustrated for improving surfaces of the part being manufactured. In step 352, layers can be selected for surface improvement either manually or automatically. In one embodiment, the surface to be improved can be selected by a human user interacting with a CAD program. In one example, a human user selects a surface on a CAD program and sets a property of the surface to indicate that surface improvement is desired. When the slice generation program operates on the 3D object in the CAD file, the slicing program can then propagate this property and mark or tag every slice or slice region with a tag, indicating that the slice is to be improved. In one embodiment, a human user acts on the slices in the database only after slice generation to manually tag every slice to be improved. As the output of a slice generation program may be a series of poly-lines, the user may select one or more poly-line segments in each slice for improvement, typically maintaining consistency vertically through the slices. This method does not require modification of the 3D CAD program and can operate on the output of a standard slice generation program. Intelligence is normally required to specify which surfaces require improvement, as the intended use may be known only to a human user. In one example, an internal bore may call for surface improvement if the intended use is to retain a load bearing round pin, but may not require surface improvement if the intended use is to pass cooling fluid.

In step 354, the current layer being operated on is initialized to be the topmost layer requiring surface improvement. The current layer surface curves are copied to a new working set of curves in step 356. In step 358, the new set of working curves are offset by the minimum acceptable alternate material shell width, typically outward from the main material toward the air side. In one method, the minimum acceptable alternate material shell width is at least two of the alternate material bead widths. The new set of offset curves is added to the curve set.

Interference is checked for in step 360. Interference means that two curves are intersecting. In one example, an alternate material curve overlaps a main material curve, which could cause alternate material, then main material to be deposited in the same location if the tool paths were generated using the overlapping curves. In another example, two alternate material curves may overlap, which would cause two tool paths to be generated for the same location, causing excess material to be deposited in that location. If an interference is detected, then step 362 is executed to clip the curves. In the example where the main material and alternate material curves intersect, the main material curves will be used to clip the alternate material curves, as the part integrity takes precedence of the surface improvement shell location.

In step 366, alternate material is assigned to the new curves, which typically corresponds to a shell of alternate material being formed near the surface of the main material. The new set of curves is added to the support set in step 368. If all layers have been processed, this is detected at step 364, and method 350 is substantially complete. If all layers have not been processed, then step 370 is executed to advance the current layer to the next layer down in step 370, and step 356 is executed again.

Method 350 illustrates but one way to form the surface improvement material layers. The present invention includes the formation of alternate material layers out a specified distance from the main material surface. The alternate material provides a mold at each main material layer surface to be improved. The distance specified is the offset distance previously referred to, and will likely be related to the final alternate material shell thickness. If the offset distance first selected does not interfere with the main material, it is left unchanged, otherwise it is clipped so as to not interfere with the main material. If the resulting alternate material curves do not interfere with other alternate material curves, they are left unchanged; otherwise, they are clipped so as to not interfere.

Figure 18:
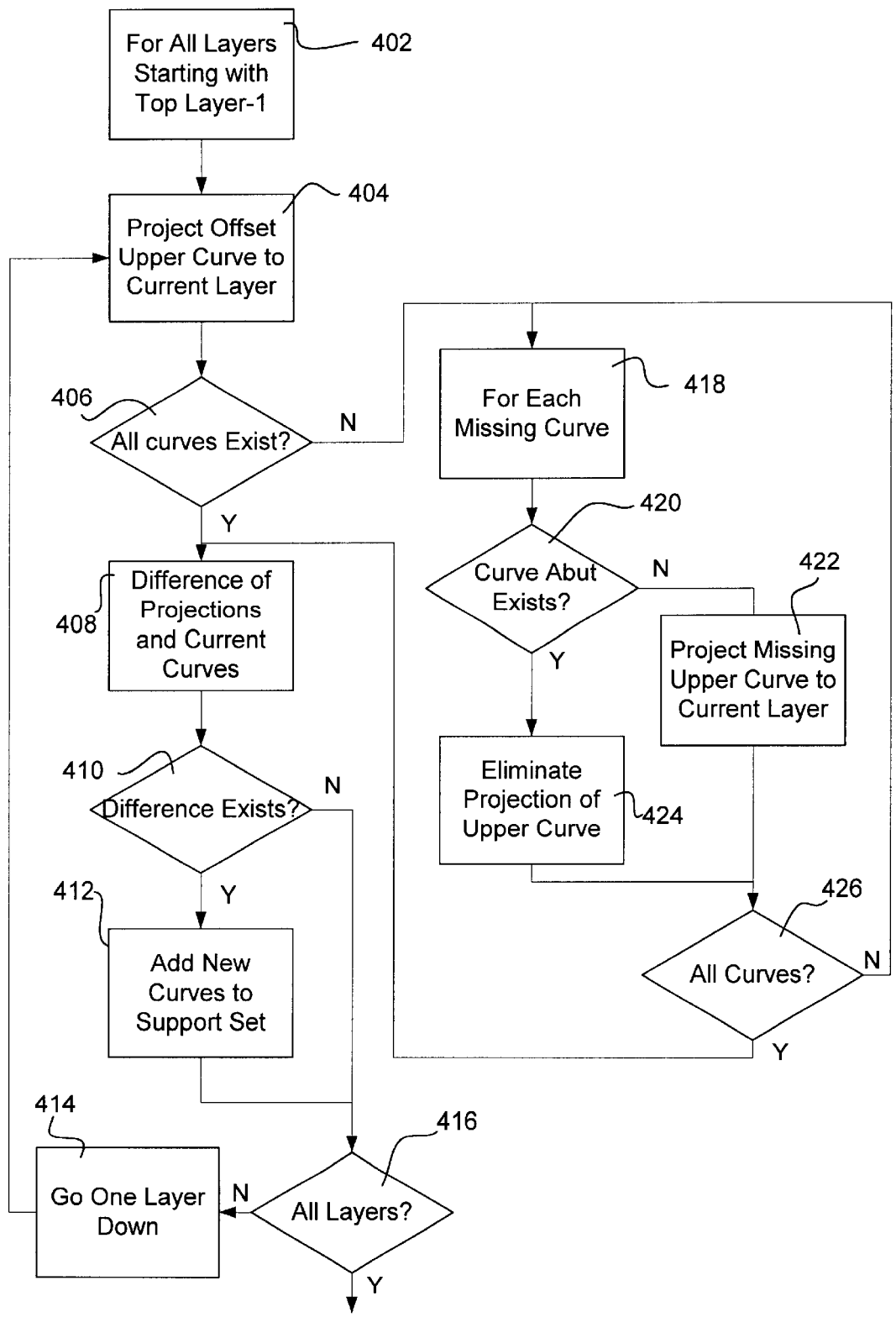
FIG. 18 is a flow chart describing a procedure for generating a minimized secondary support structure.

Referring now to FIG. 18, a method 400 is illustrated, suitable for generating curves for minimized support structures such as described in FIGS. 14A–C and 15A–C. In step 402, the current layer is initialized to be the layer immediately below the top layer, as there is nothing to support above the top layer. The current layer is thus the lower layer of a pair and the layer immediately above is the upper layer of the pair. In step 404, the upper curve is copied and offset or indented in, thus creating a new smaller area curve, which is projected onto the lower current layer. Thus, a curve that may be smaller or larger than the current layer is projected onto the current layer. In some embodiments, the upper curve is offset in along some curve perimeters but not others. In one embodiment, the user can specify certain layer edges as being anchored, such that when a copy is made of the curve, the offset is taken only inward from some edges, but not others. In one example, the top two layers of FIG. 14C could be anchored, such that the upper layers are never indented in from the right, which could call for the support material to form a pillar not abutting the main material portion at the right.

A check is made in step 406 to determine if the offset, reduced area upper curve even exists after the offsetting, as it may have been reduced either to nothing or a size below a limit. In one illustrative example, a $\frac{1}{10}$-inch diameter circle offset in by $\frac{1}{10}$th inch will vanish. Step 408 finds the difference in projection by subtracting the current layer curve from the projected offset curve. For example, in a solid cylindrical region, the upper layer will be a circular layer the same size as the lower layer. The algorithm will make a copy of the upper layer and offset this upper layer curve inward by the offset or indent amount. In the cylindrical solid case, the upper offset circle will have the lower full size circle subtracted from it, leaving negative area, as there is no unsupported material above the current layer. In the case of an overhang, such as a cantilevered region, the overhanging curve, once reduced, will have the support member subtracted from it, leaving the reduced overhang area as the difference area.

Step 410 determines whether a difference exists, that is, whether any part of the offset upper curve is not supported by the lower layer. The projection, difference calculation, and check for a difference thus determines whether the upper layer, once reduced by the offset, is fully supported by the layer below. An unsupported portion of an upper curve corresponds to beads that will fall unless a support has been built immediately beneath those beads prior to their deposition.

If a difference exists, step 412 is executed, and the offset curve is added to the set of curves belonging to the set of support set curves. The newly added curve is tagged or identified as being a support layer curve, but will be later treated in many respects as a main material layer, as the support layer also requires support during deposition, even though the purpose of the support layer is different than the purpose of the main material layer.

Step 416 determines whether all layers have been processed. If true, this portion of the processing is complete for algorithm 400. If more layers require processing, step 414 is executed to increment the layer, making the next lower layer the current layer. Execution proceeds again at step 404.

If step 406 determines that one or more curves have disappeared, then step 418 is executed. Step 418 begins iterating through each missing or vanished curve. In step 420, a check is made to determine whether the missing curve abuts another layer. If this is true, then it may be possible to completely eliminate the support material layer, as illustrated with support base layer 205 in FIG. 14C, as the small support layer portion, for example one third of a bead width, is adequately supported by the layer below. In step 424, the projected upper curve is eliminated. If the curve does not abut, then step 422 is executed, and the original upper curve or some minimally dimensioned upper curve is projected onto the current layer. In this way, a minimally dimensioned support column, as illustrated in FIG. 15C, can be continued downward without further offsetting to provide support for the higher layers.

Method 400 thus operates by taking each layer, determining whether the layer above, when reduced inward by an offset, would be unsupported by the current layer, and if so, adding a support material layer level with the current layer. When the current layer is abutting another layer, the layer above may be eventually reduced to nothing. When the current layer is not abutting another layer, the layer above may be clamped such that it is never reduced below a minimum dimension, providing a minimum cross section column for the remainder of the vertical distance to the cavity floor or the workpiece platform.

Figure 19:
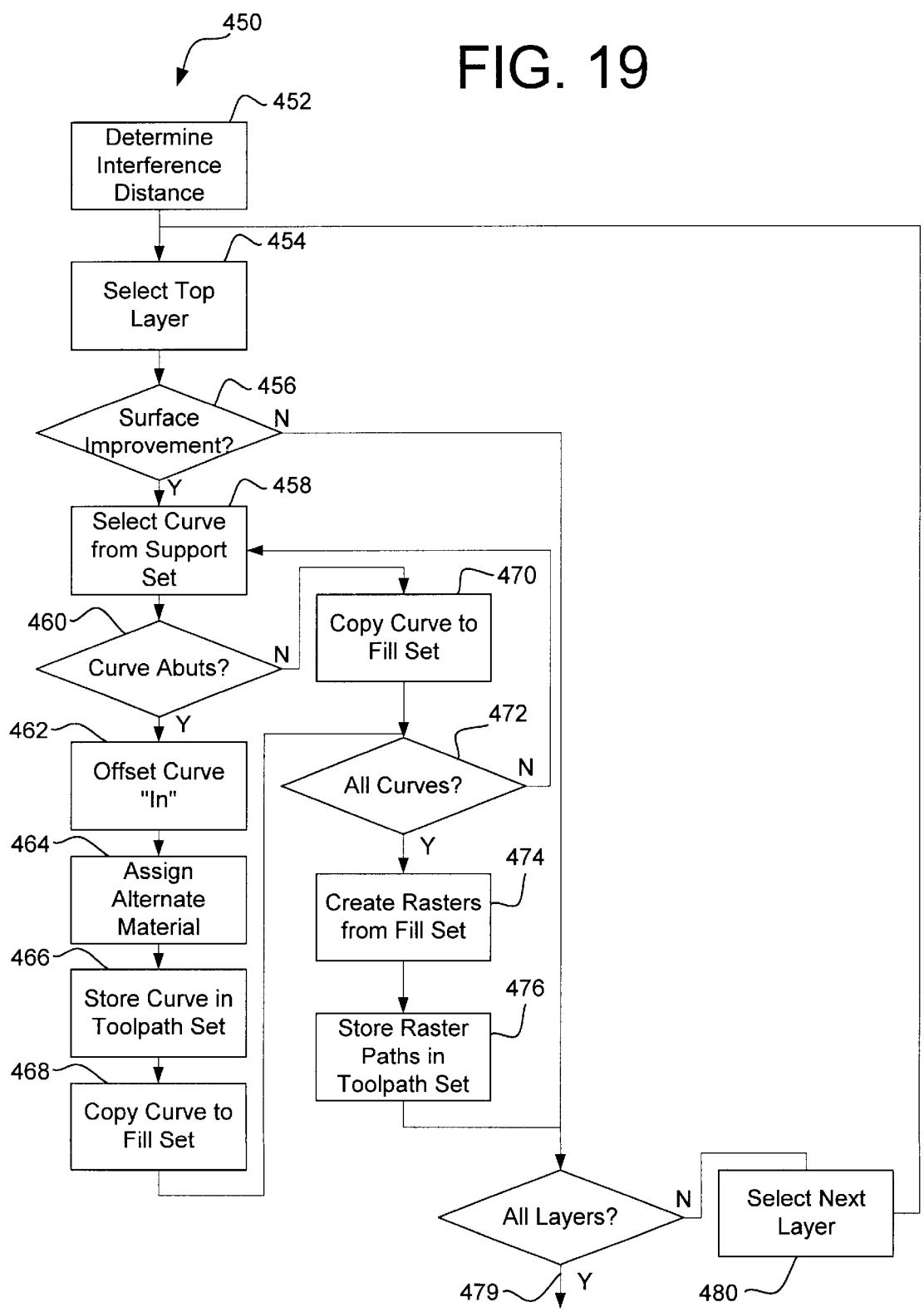
FIG. 19 is flow chart describing a procedure for generating tool paths for improved surface characteristics.

Referring now to FIG. 19, a method 450 for creating support material layer tool paths is illustrated. Method 450 is only one example of a method suitable for creating minimized support layer tool paths. Method 450 can start with the support and main material layers or slices already calculated. The curves or outlines of the main material layers and the support layers have been calculated, but not the raster tool paths within.

In step 452, the interference distance for the support material is determined. For example, the interference distance can be set to the bead width of the alternate material. In step 454, the current layer is initialized to be the top layer. A decision step 456 checks whether the current layer requires surface improvement; if not, a check is made in step 478 as to whether all layers have been processed. If all layers have been processed, then the method is essentially finished, and the method proceeds to 479. If all layers have not been processed, then the next layer is set to be the current layer at 480, and step 456 is executed again.

If surface improvement is required for the current layer, then in step 458 the previously generated curve from the support set is retrieved. If the retrieved curve does not abut the main material, checked in step 460, then the curve is copied to the fill set in step 470, with further processing discussed below. If the retrieved curve does abut the main material, then the support material curve is offset in the inward direction by the support material bead width, toward the support material, in step 462. The new curve can be used as the contour tool path for the alternate material. In step 464, the alternate material is assigned to the curve which is stored in the tool path set in step 466. The curve is also copied to the fill set in step 468, with execution proceeding to step 472. If all support curves for this layer have been processed, checked at step 472, then the rasters are created in step 474 and stored in the tool path set in step 476. Execution then proceeds as previously described at step 478.

Figure 20:
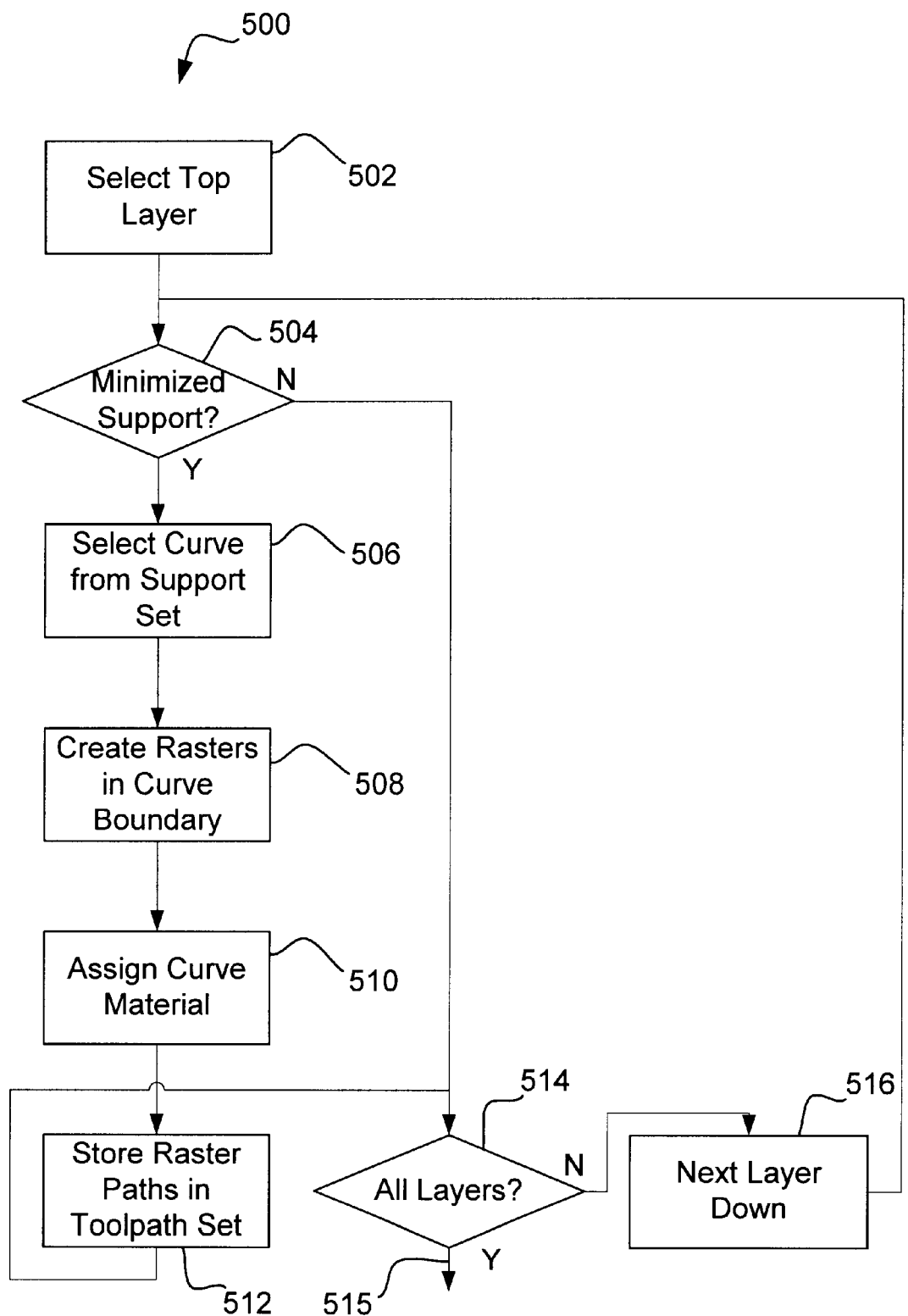
FIG. 20 is a flow chart describing a procedure for tool path generation for minimized support.

Referring now to FIG. 20, a method 500 is illustrated for generating tool paths for minimized support layers. Beginning at step 502, the current layer is initialized to be the top layer. If the current layer is to receive minimized support, checked at step 504, then the curve is selected from the support set at step 506. In step 508, rasters are created within the curve boundary to fill the layer with support material. Support material is assigned to the rasters in step 510, and the rasters stored in the tool path set in step 512. If all layers have been processed, checked in step 514, then method 500 is essentially finished and execution proceeds to 515. If all layers have not been processed, then the current layer is incremented to the next layer down in step 516, and execution proceeds again to step 504.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An object formed using layered manufacturing comprising:

at least one surface; and a plurality of layers bonded together defining and having inter-layer regions therebetween, said inter-layer regions intersecting said surface; and wherein:

said inter-layer regions have a plurality of convex shapes which are part of said plurality of layers, where said inter-layer regions intersect said surface; and the plurality of convex shapes is formed from said plurality of layers.

2. An object formed using layered manufacturing as in claim 1, wherein said layers have intra-layer regions disposed laterally within said layers, wherein said intra-layer regions intersect said surface, further comprising a plurality of concave shapes formed from said layers, where said intra-layer regions intersect said surface.

3. A object formed using layered manufacturing as in claim 2, wherein said inter-layer regions and intra-layer regions together define at least half of said surface.

4. An object formed from a plurality of stacked layers of a first material bonded together, wherein said stacked layers have a top lateral surface, a bottom lateral surface, a center plane disposed between said top and bottom layer lateral surfaces, and at least one layer side face, wherein said object has at least one side surface formed from said layer side faces, wherein said side faces have a concavity near said center plane.

5. An object formed from a plurality of stacked layers as in claim 4, wherein said layers have a thickness and said concavity has a radius of curvature at least one-fourth (¼) of said layer thickness.

6. An object formed from a plurality of stacked layers as in claim 4, wherein said layers have a thickness and said concavity has a radius of curvature at least one-third (⅓) of said layer thickness.

7. An object formed from a plurality of stacked layers as in claim 6, wherein said stacked layer top and bottom surfaces together form convexities at said side surfaces.

* * * * *